United States Patent [19]
Tokai

[11] Patent Number: 5,704,238
[45] Date of Patent: Jan. 6, 1998

[54] AUTOMATIC DIE DRIVING AMOUNT CORRECTION METHOD

[75] Inventor: Shigeru Tokai, Ishikawa, Japan

[73] Assignee: Komatsu Ltd., Tokyo, Japan

[21] Appl. No.: 693,255

[22] PCT Filed: Mar. 27, 1995

[86] PCT No.: PCT/JP95/00572

§ 371 Date: Aug. 19, 1996

§ 102(e) Date: Aug. 19, 1996

[87] PCT Pub. No.: WO95/26240

PCT Pub. Date: Oct. 5, 1995

[30] Foreign Application Priority Data

Mar. 29, 1994 [JP] Japan .................... 6-59161

[51] Int. Cl.⁶ .................... B21C 51/00
[52] U.S. Cl. .................... 72/31.11; 72/389.3; 72/16.2
[58] Field of Search .................... 72/31.11, 31.12, 72/16.2, 16.8, 16.9, 17.3, 18.1, 18.6, 20.2, 20.4, 380, 389.1, 702, 31.1, 20.1, 389.3

[56] References Cited

U.S. PATENT DOCUMENTS

| | | | |
|---|---|---|---|
| 4,772,801 | 9/1988 | Fornerod et al. | 72/17.3 |
| 4,947,666 | 8/1990 | Hametner et al. | 72/702 |
| 5,055,752 | 10/1991 | Leistensnider et al. | 72/16.2 |
| 5,148,693 | 9/1992 | Sartorio et al. | 72/18.1 |
| 5,285,668 | 2/1994 | Tokai | 72/17.3 |
| 5,375,340 | 12/1994 | Gerritson | 72/17.3 |
| 5,461,893 | 10/1995 | Tyler | 72/16.2 |
| 5,497,647 | 3/1996 | Nagakura | 72/702 |

FOREIGN PATENT DOCUMENTS

| | | | |
|---|---|---|---|
| 1271013 | 10/1989 | Japan | 72/31.12 |
| 0006020 | 1/1990 | Japan | 72/702 |
| 4-135018 | 5/1992 | Japan . | |
| 4-251614 | 9/1992 | Japan . | |
| 5-69046 | 3/1993 | Japan . | |
| 5057353 | 3/1993 | Japan | 72/702 |
| 2213086 | 9/1989 | United Kingdom | 72/20.2 |

*Primary Examiner*—Lowell A. Larson
*Assistant Examiner*—Ed Tolan
*Attorney, Agent, or Firm*—Nikaido, Marmelstein, Murray & Oram LLP

[57] ABSTRACT

According to data from an NC device 10, a processing factor specifying section 13 specifies processing factors having effect on the bending angle. A tolerance setting section 14 sets a tolerance for each specified processing factor and a bend grouping section 15 classifies bends into groups using the tolerances. Then, a correcting condition setting section 16 establishes correcting conditions and a correction data computing section 17 computes correction data for depth according to data representative of the actual depth of an acceptable bend so as to meet the correcting conditions. Based on the correction data, a process data modifying section 18 modifies data representative of the processes of a bending operation. In this way, depth for a bend the angle of which has not been measured can be corrected based on the correction value for depth for another bend the angle of which has been measured.

6 Claims, 6 Drawing Sheets

AUTOMATIC DIE DRIVING AMOUNT CORRECTION METHOD

TECHNICAL FIELD

The present invention relates to an automatic die driving amount correction method well adopted for use in a bending machine such as a press brake to measure the bending angle of a workpiece during bending operation and correct the driving amount of a die according to the measured value of the bending angle.

BACKGROUND ART

In a known method for bending a sheet-like workpiece by use of a bending machine such as a press brake, various kinds of information including workpiece conditions (e.g., the thickness and material of a workpiece), die conditions and machine conditions are input in an NC device; a driving amount for a movable die (i.e., either the upper die or lower die) is calculated from the input information; and the movable die is driven to the drive end thus calculated to produce a desired bent article.

Even though driving of the movable die is based on many pieces of information, the above method often fails in obtaining a desired bending angle and therefore cannot avoid an error in a bending angle, because of variations from batch to batch in workpiece thickness, characteristics and processing conditions.

There have been made one attempt to achieve high-accuracy bending operation free from bending angle errors due to variations in materials etc., in which the bending angle of a workpiece is measured during bending operation and according to the measured value, the driving amount of the die is corrected. Japanese Patent Laid-Open Publication No. 5-69046 (1993) discloses one example of bending machines incorporating a bending angle measuring means for performing such correction. According to the metal plate bending machine disclosed in this publication, a slit light is projected onto the external surface of a metal sheet being bent to form a linear projected light image which is then picked up by a photographing means and based on this picked-up image, the bending angle of the metal sheet is calculated to correct the driving amount of the die.

Bending machines having such a conventional bending angle measuring means, however, present the disadvantage that they have difficulty or sometimes fail in measuring bends formed in workpieces of some configurations. In such a case, there inevitably occurs an error in the angle of the bend. Another disadvantage of the conventional bending machines of this type is such that when bending a workpiece at a plurality of positions to form a plurality of bends, driving of the die must be interrupted to make an angle measurement whenever bending of a bend is performed. This results in prolonged processing time.

DISCLOSURE OF THE INVENTION

The invention has been made for the purpose of overcoming these problems and therefore one of the objects of the invention is to provide an automatic die driving amount correction method with which improved bending angle accuracy can be ensured for articles having a plurality of bends some of which are difficult or impossible to measure and with which processing time can be considerably reduced.

The above object can be accomplished by an automatic correction method for correcting the driving amount of a movable die based on a measured value obtained by measuring the bending angle of a workpiece during bending operation, characterized in that:

for bending the workpiece at a plurality of positions to form a plurality of bends, a correction value for the driving amount of the die to form a certain bend, the correction value being based on a measured value obtained from a measurement of the angle of the certain bend, is utilized for calculation of a correction value for the driving amount of the die to form any one of the remaining bends.

According to the invention, for bending a workpiece at a plurality of positions to form a plurality of bends, the angle of a certain bend is first measured during bending operation and a correction value for the driving amount of the die is calculated from the measured value. With this correction value, bending is then performed to form the certain bend. When bending is performed to form any one of the remaining bends, a correction value for the driving amount of the die to form the remaining bend is computed from the correction value for the certain bend. With the correction value for the remaining bend thus obtained, bending for the remaining bend is performed. With this arrangement, even if the angles of some bends to be formed are difficult or impossible to measure, improved bending accuracy for the bends can be ensured. This also obviates the need to make a bending angle measurement for every bend, which leads to saving of the time required for a series of operations.

According to the invention, the plurality of bends are classified into groups according to processing factors associated with their bending angles, and where one of the classified bends is in the same group as that of the certain bend, the calculation of the correction value for the die driving amount for the remaining bend is carried out.

Where one of the classified bends belongs to a group different from that of the certain bend, the correlation between the respective processing factors of these two different groups is obtained based on which the correction value for the die driving amount for the former bend is calculated.

In this way, from a correction value for the die driving amount for a certain bend whose angle has been measured, correction values for the die driving amounts to form the remaining bends can be obtained, some of the remaining bends belonging to the same group as that of the certain bend while others belonging to different groups from that of the certain bend. Consequently, all the bends can be formed with high accuracy for a short time.

Preferably, a tolerance for each processing factor associated with the bending angles of the bends is preliminarily established to be used in the classification of the bends according to the processing factors and if the processing factors of a bend fall within the tolerances of the processing factors for a particular group, it is determined said bend is classified into said particular group. This facilitates the classification and the calculation of a correction value for the driving amount of the die.

Examples of the processing factors associated with the bending angles of the bends include a target bending angle for a bend, the length of a bending line, the configuration of an upper die and the configuration of a lower die.

Other objects of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description.

BRIEF DESCRIPTION OF DRAWINGS

FIG. 1 is a diagram illustrating the structure of a bending system used in one embodiment.

FIG. 2 is a perspective view of one example of bent articles produced in the embodiment.

FIG. 3 illustrates the stages of bending performed in the embodiment.

FIG. 4 is a flow chart of control performed by a control system according to the embodiment.

FIG. 5 is a flow chart of a routine for interpreting correcting conditions and executing a correction process, the routine being included in the control shown in FIG. 4.

FIG. 6 is a perspective view of another example of bent articles produced in the embodiment.

BEST MODE FOR CARRYING OUT THE INVENTION

Figure 1:
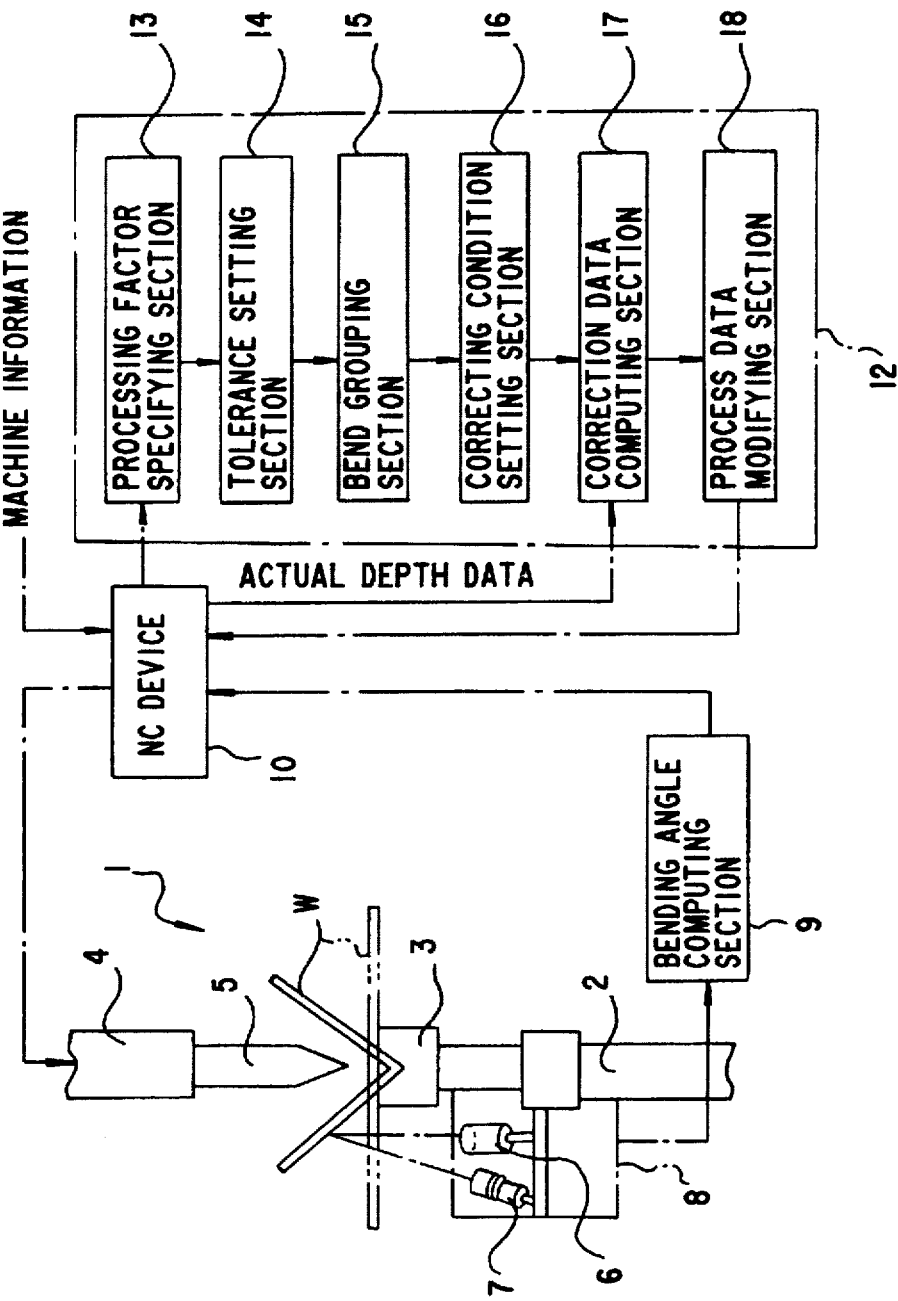
FIGS. 1 to 6 are associated with a preferred embodiment of an automatic die driving amount correction method according to the invention.

Referring now to the drawings, an automatic die driving amount correction method will be hereinafter described according to a preferred embodiment of the invention.

FIG. 1 shows the structure of a system used in one embodiment of the invention.

In this embodiment, a press brake 1 comprises a lower die (die) 3 supported on a mount 2 and an upper die (punch) 5 that is arranged in opposing relationship with the lower die 3, being attached to the underside of a ram 4. The ram 4 is so disposed as to be lifted and lowered above the lower die 3. Inserted between the lower die 3 and the upper die 5 is a workpiece W formed from a metal sheet. Bending of the workpiece W is performed in such a manner that the workpiece W is pressed by the lower die 3 and the upper die 5 by lowering the ram 4 with the workpiece W placed on the lower die 3.

On the front side (user side) of the mount 2, there is provided an angle measuring unit 8 which comprises a slit-shaped light source 6 for projecting a linear light image onto the outer face of the bent workpiece W and a CCD camera 7 for picking up the linear light image formed by the light source 6. The angle measuring unit 8 measures the bending angle of the workpiece W. The angle measuring unit 8 may be positioned on the back (machine side) of the mount 2 instead of the front side of the same. Another alternative is such that two such angle measuring units 8 are provided on the front side and back of the mount 2 respectively thereby to measure the bending angle at the two outer faces of the bent workpiece W individually.

The image picked up by the CCD camera 7 is displayed on a monitor television (not shown) while it is processed as image data in a bending angle computing section 9. The bending angle computing section 9 computes the bending angle of the workpiece W and the result of this arithmetic operation is input in an NC device 10. Input in the NC device 10 is measured data representative of the bending angle of the workpiece W. Apart from this measured data, workpiece information (material, the length of a bending line, bending angle, etc.), die information (die height, V-groove width, V-angle, punch R, etc.), and machine information (rigidity, speed specification, stroke specification, etc.) are input in the NC device 10 beforehand.

The NC device 10 computes a reference lower limit value (i.e., reference depth) for the ram 4 based on the workpiece information, die information and machine information and based on the result of this arithmetic operation, the ram 4 is controlled to perform bending. At that time, the actual bending angle of the workpiece W during bending operation is calculated in the bending angle computing section 9 and the result of the operation is input in the NC device 10. Based on the input data representative of the bending angle, the NC device 10 calculates a correction value (depth correction amount) for the lower limit for the ram 4 and this depth correction amount is added to the aforesaid reference depth to obtain a final depth. According to the final depth thus obtained, the ram 4 is driven.

Figure 2:
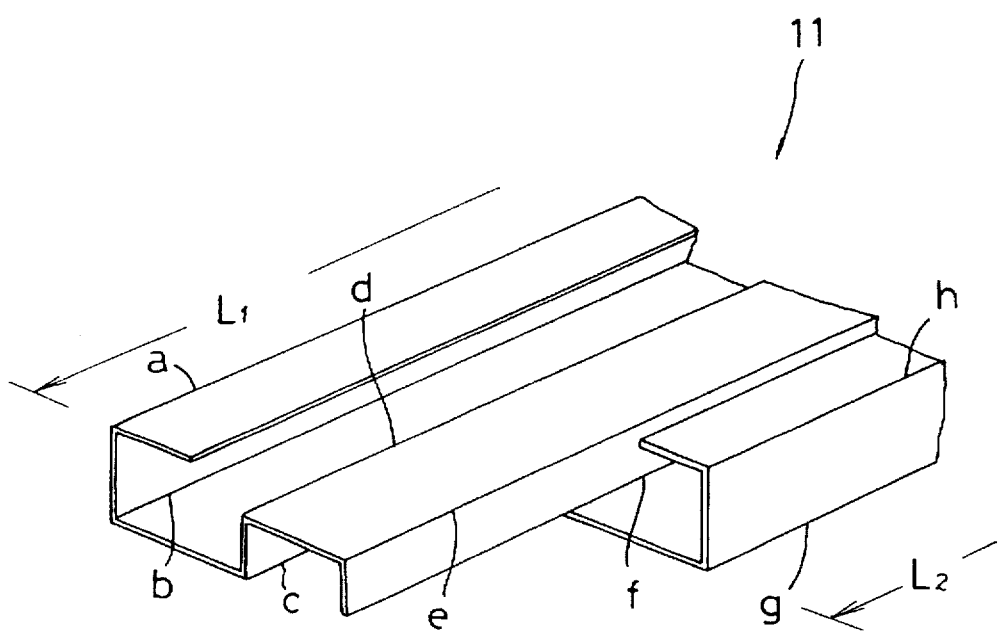
Figure 3:
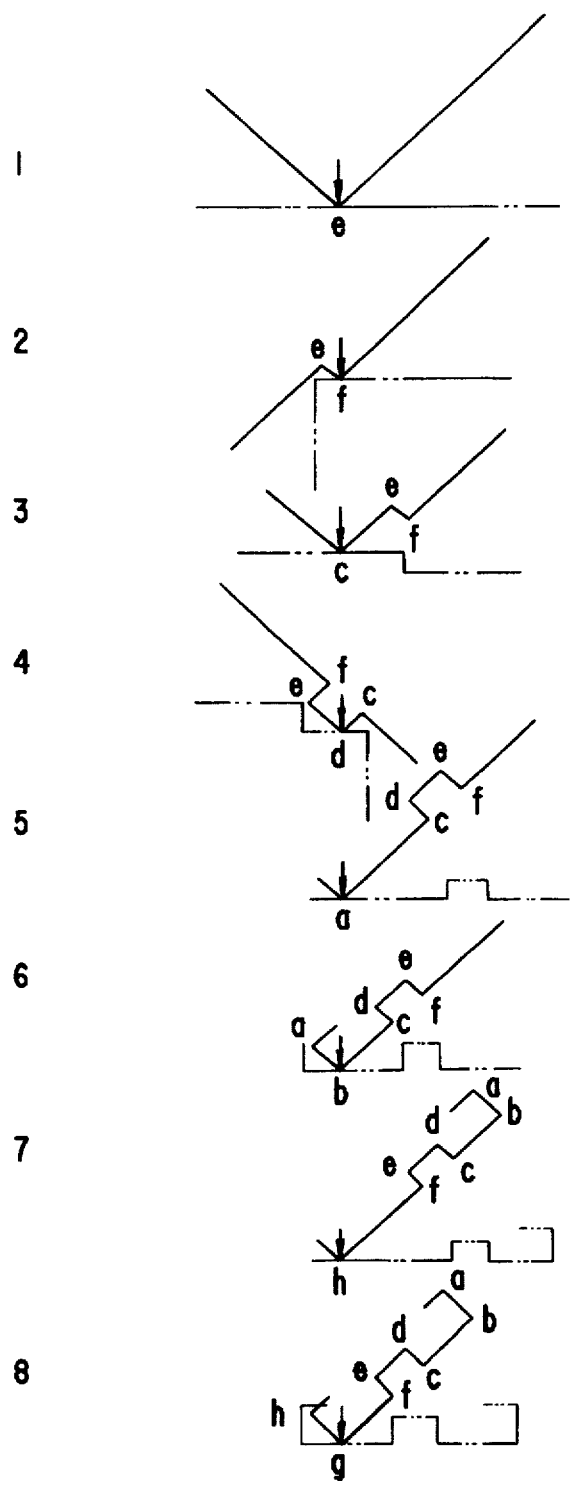

The above procedure is taken for controlling the ram 4 to perform bending in cases where a bent article having a single bend is produced. On the other hand, where a bent article 11 having a plurality of bends a to h such as shown in FIG. 2 (in this figure, a sash is shown by way of example) is produced, there arise the following two problems as seen from the bending process shown in FIG. 3. (I) A bending angle measurement cannot be made for some bends (Stages 2 and 4). (II) If a bending angle measurement is made for all the bends, it takes too much processing time. To solve these problems, this embodiment is designed to utilize data on a certain bend, the angle of which has been measured, for the calculation of final depths for other bends. To enable such a calculation, the control system of this embodiment incorporates an automatic practicable-bend-classification unit 12 (see FIG. 1) and data computed by the automatic practicable-bend-classification unit 12 is input in the NC device 10.

The automatic practicable-bend-classification unit 12 comprises: (1) a processing factor specifying section 13 for specifying, according to data from the NC device 10, the target bending angle for a bend, the length of a bending line ($L_1$, $L_2$), the configuration of the upper die (punch R, angle, height, shape), the configuration of the lower die (V-width, V-angle, height) etc. which are processing factors having effect on the bending angle of a bend; (2) a tolerance setting section 14 for setting a tolerance for each processing factor specified by the processing factor specifying section 13 to be used in grouping; (3) a bend grouping section 15 for classifying bends into groups using the tolerances set by the tolerance setting section 14; (4) a correcting condition setting section 16 for setting correcting conditions for each of the bends which have been put in the same group or different groups by the bend grouping section 15; (5) a correction data computing section 17 for computing correction data for a depth so as to meet the correcting conditions set by the correcting condition setting section 16, based on data representative of the actual depth (input data from the NC device 10) of a bend for which a bending angle measurement has been made (i.e., an acceptable bend); and (6) a process data modifying section 18 for modifying data representative of the processes of a bending operation, based on the correction data sent from the correction data computing section 17. The output data from the process data modifying section 18 is entered in the NC device 10 to correct, as required, the depth of the ram 4 to form a bend for which a bending angle measurement has not been made.

Figure 4:
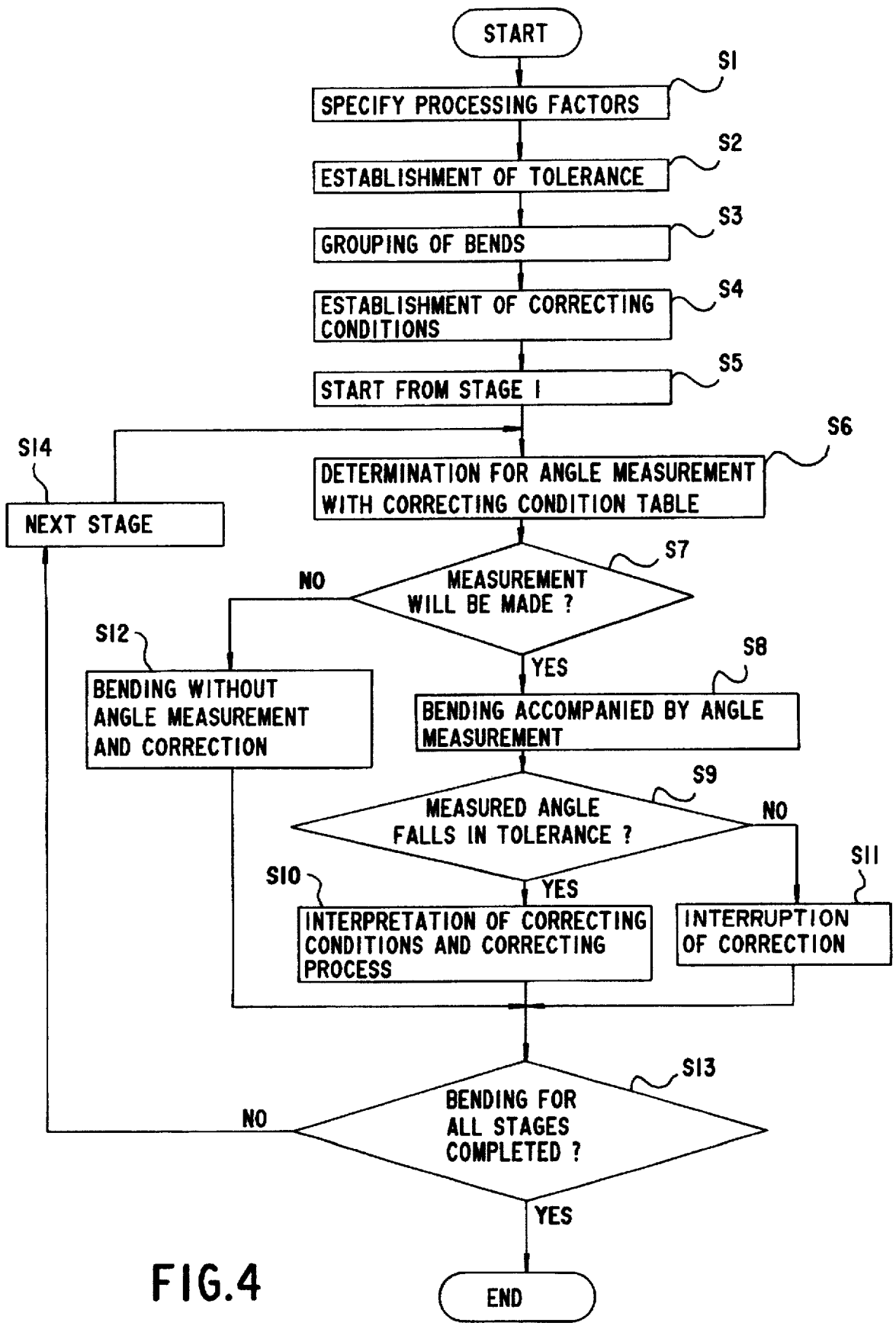

Reference is now made to FIG. 4 to describe a flow of operation in the control system mentioned above.

S1: The processing factor specifying section 13 specifies processing factors (the target bending angle, the length of a bending line, the configuration of the upper die, the configuration of the lower die, etc.) which are associated with and affect the bending angles of the bends.

S2: The tolerance setting means 14 establishes a tolerance for each processing factor specified in S1 to be used in grouping.

S3: The bend grouping section 15 performs the classification of bends. Taking the bent article 11 shown in FIG. 2 for example, bends a to h can be classified into two groups according to the lengths $L_1$, $L_2$ of bending lines. Specifically, the bends a, b, c, d and e are classified into a group (G1) whereas bends f, g and h are into another group (G2).

S4: The correcting condition setting section 16 establishes correcting conditions according to a correcting condition table. For correction, the following cases are conceivable.

Case 1: Correction for bends in the same group

One of the following conditions is selected:

(1) bending operations for all bends in the same group are corrected; (2) bending operations for only specified bends in the same group are corrected; and (3) bending operations for some arbitrary bends in the same group are corrected at a time.

Case 2: Correction for remaining bends in the same group

Where bending operations for some bends in the same group have been completed and the remaining bends in the same group will be corrected, one of the following conditions is selected:

(1) bending operations for all of the remaining bends in the same group are corrected; (2) bending operations for only specified remaining bends in the same group are corrected; and (3) bending operations for some arbitrary remaining bends in the same group are corrected at a time.

Case 3: Determination whether or not correction for bends in a different group is to be executed It is determined whether or not bending operations for bends in a different group will be corrected.

Case 4: Determination whether or not depth correction is to be accepted

It is determined whether or not arrangement is made to forcibly exempt some bends from correction.

Case 5: Correction for bends in a different group

One of the following conditions is selected:

(1) bending operations for all bends in a different group are corrected; (2) bending operations for only specified bends in a different group are corrected; and (3) bending operations for some arbitrary bends in a different group are corrected at a time.

Case 6: Correction for remaining bends in a different group

Where bending operations for some bends in one group have been completed and bends in a different group will be corrected, one of the following conditions is selected:

(1) bending operations for all bends in a different group are corrected; (2) bending operations for only specified bends in a different group are corrected; and (3) bending operations for some arbitrary bends in a different group are corrected at a time.

Table 1 shows one example of the correcting condition table used in the case of the bent article (sash) shown in FIG. 2.

TABLE 1

| STAGE (BENDING ORDER) | BEND CODE | GROUP | MEASURA- BILITY | CORRECTION FOR SAME GROUP INDICATION OF PRACTICABLE BEND | ACCEPTANCE OF CORRECTION |
|---|---|---|---|---|---|
| 1 | e | G1 (a,b,c,d) | POSSIBLE | a,b,c,d,e (correct all groups) | YES |
| 2 | f | G2 (g,h) | IMPOSSIBLE | IMPOSSIBLE | YES |
| 3 | c | G1 (a,b,d,e) | POSSIBLE | c (correct bend c only) | YES |
| 4 | d | G1 (a,b,c,e) | IMPOSSIBLE | IMPOSSIBLE | YES |
| 5 | a | G1 (b,c,d,e) | POSSIBLE | a,e (correct bends a,e) | YES |
| 6 | b | G1 (a,c,d,e) | POSSIBLE | NO CORRECTION | YES |
| 7 | h | G2 (f,g) | POSSIBLE | f,g,h (correct bends f,g,h) | YES |
| 8 | g | G2 (f,h) | POSSIBLE | NO CORRECTION | YES |

| | CORRECTION FOR DIFFERENT GROUP | | | |
|---|---|---|---|---|
| STAGE (BENDING ORDER) | PRESENCE OR ABSENCE | DISPLAY OF CORRECTABLE BEND | INDICATION OF PRACTICABLE BEND | ANGLE MEASURE- MENT IN BENDING |
| 1 | PRESENT | f,g,h | f (correct bend f) | YES |
| 2 | IMPOSSIBLE | IMPOSSIBLE | IMPOSSIBLE | IMPOSSIBLE |

TABLE 1-continued

| 3 | ABSENT | NO DISPLAY | NO INDICATION | YES |
|---|---|---|---|---|
| 4 | IMPOSSIBLE | IMPOSSIBLE | IMPOSSIBLE | IMPOSSIBLE |
| 5 | ABSENT | NO DISPLAY | NO INDICATION | YES |
| 6 | ABSENT | NO DISPLAY | NO INDICATION | NO |
| 7 | PRESENT | a,b,c,d,e | a | YES (correct bend a) |
| 8 | ABSENT | NO DISPLAY | NO INDICATION | NO |

In the column "GROUP" of Table 1, which group G1 or G2 each bend belongs to is indicated and the codes of other bends that belong to the same group are parenthesized. In the column "MEASURA-BILITY", it is indicated whether or not a bending angle measurement is possible for each bend. In the column "CORRECTION FOR THE SAME GROUP", practicable bends in the same group are indicated. It should be noted that data in the column "CORRECTION FOR THE SAME GROUP" are updated and overwritten in every stage to give priority to new data. In the column "ACCEPTANCE OF CORRECTION", it is indicated whether or not correction is to be accepted. In the column "CORRECTION FOR DIFFERENT GROUP", data on the presence or absence of correction, display of correctable bends and indication of practicable bends are indicated. In the column "ANGLE MEASUREMENT IN BENDING", it is indicated whether or not an angle measurement is to be actually made.

This correcting condition table indicates how to correct succeeding stages each time one stage has been completed. Accordingly, the practicable bends indicated in each "STAGE" column of this table are corrected. If there is indicated a practicable bend in the column "CORRECTION FOR THE SAME GROUP" of one stage, it means that an angle measurement will be performed in this stage. If it is indicated in a "STAGE" column to perform correction for a bend in a preceding stage for which bending operation has been already finished, this correction will be performed from bending of the next workpiece.

S5: A bending operation is started from the stage 1.

S6 to S7: For judgment, data on whether or not an angle measurement will be made is read from the correcting condition table. If it is judged that a measurement will be made, the flow proceeds to S8 and if not, the flow proceeds to S12.

S8 to S9: As it has been determined that an angle measurement will be made, a bending operation accompanied by an angle measurement is performed (S8). A check is then made to determine if the measured value obtained from the angle measurement is within a tolerance (S9). If so, the flow then proceeds to S10. If the measured value exceeds the tolerance, the flow proceeds to S11.

S10: A routine for interpreting correcting conditions and for executing a correction process. Details will be described later with reference to the flow chart of FIG. 5.

S11: As it has been judged that the measured angle exceeds the tolerance, a correction is not made.

S12: As it has been determined that no angle measurement will be made, a bending operation is performed without making an angle measurement and without a correction based on an angle measurement.

S13: A check is made to judge if bending operations for all the stages have been completed, and if so, the flow is ended. If not, the flow proceeds to S14.

S14: A bending operation for the next stage is started by repeating the steps on and after S6.

Figure 5:
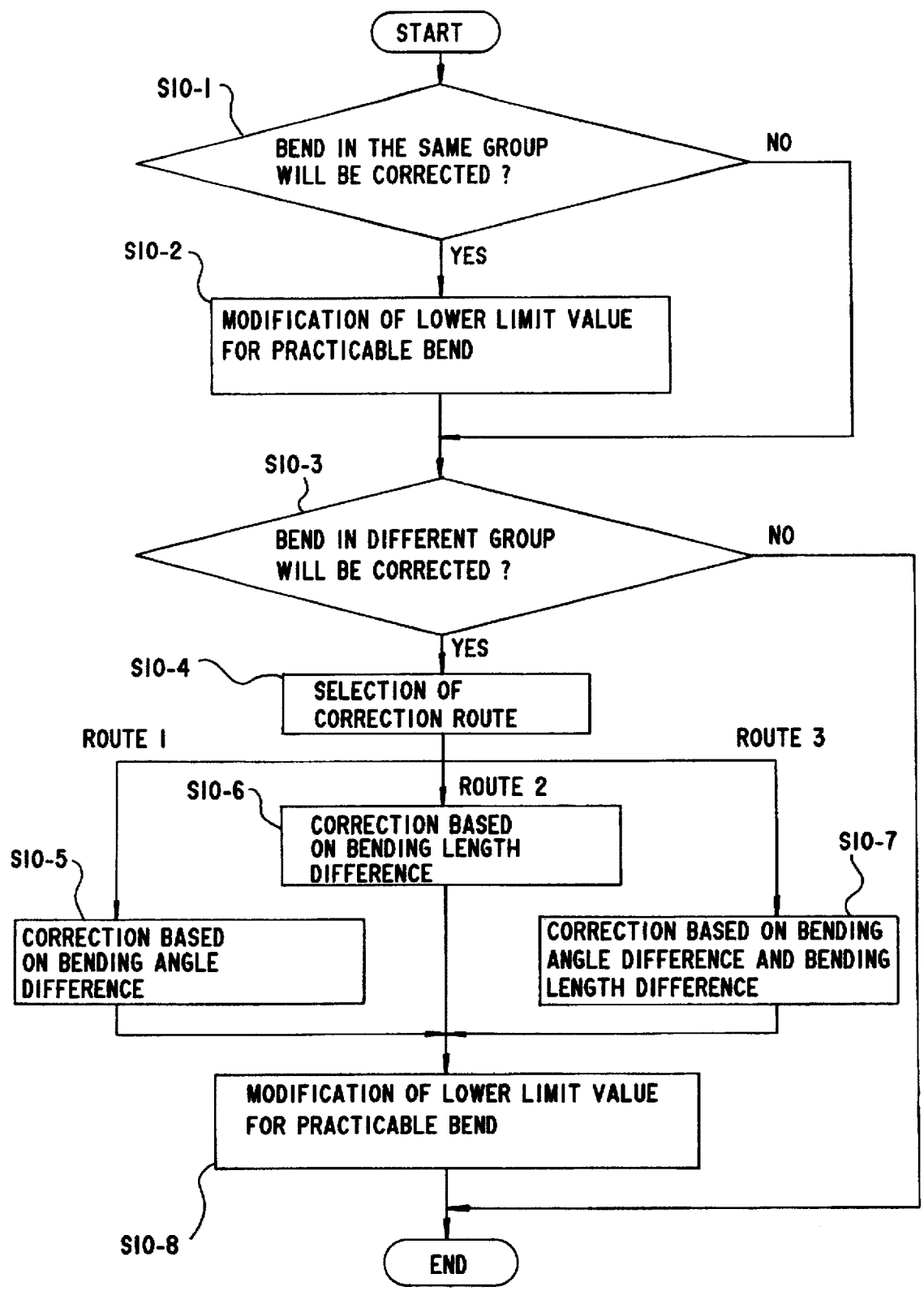

Referring to FIG. 5, the routine for interpreting correcting conditions and executing a correction process (S10) will be described.

S10-1 to S10-2: A check is made to determine if a correction for the same group will be made (S10-1). If so, a ram lower limit value related to a practicable bend is modified, based on the correction value for the ram lower limit value for the bend whose angle has been measured (S10-2). If a correction will not be made, the flow proceeds to S10-3.

S10-3: A check is made to determine if a correction for a different group will be made. If so, the flow proceeds to S10-4 and if not, the flow is ended.

S10-4: It is detected from the correcting condition table which processing factor is different between the groups. Based on this detection, a correction route is selected. In this flow, the processing factors used for grouping are the length of a bending line and a target bending angle for a bend. According to the two factors, one of the three correction routes (Route 1, Route 2 and Route 3) is selected. It should be understood that the correcting condition table includes a grouping table such as shown in Table 2 (to be described later) although Table 1 does not show. The aforesaid detection of the difference between the processing factors of the groups is based on such a grouping table.

S10-5 to S10-7: If there is a difference only in the target bending angle between the groups, Route 1 is selected and an arithmetic operation is executed to obtain a correction value based on the difference in the target bending angle (S10-5). If there is a difference only in the length of a bending line between the groups, Route 2 is selected and an arithmetic operation is executed to obtain a correction value based on the difference in the length of a bending line (S10-6). If the target bending angle and the length of a bending line are both different, Route 3 is selected and an arithmetic operation is executed to obtain a correction value based on the differences in the target bending angle and the length of a bending line (10-7).

S10-8: With the correction value for the lower limit for the ram obtained through the arithmetic operation, the ram lower limit value for the practicable bend is modified.

Figure 6:
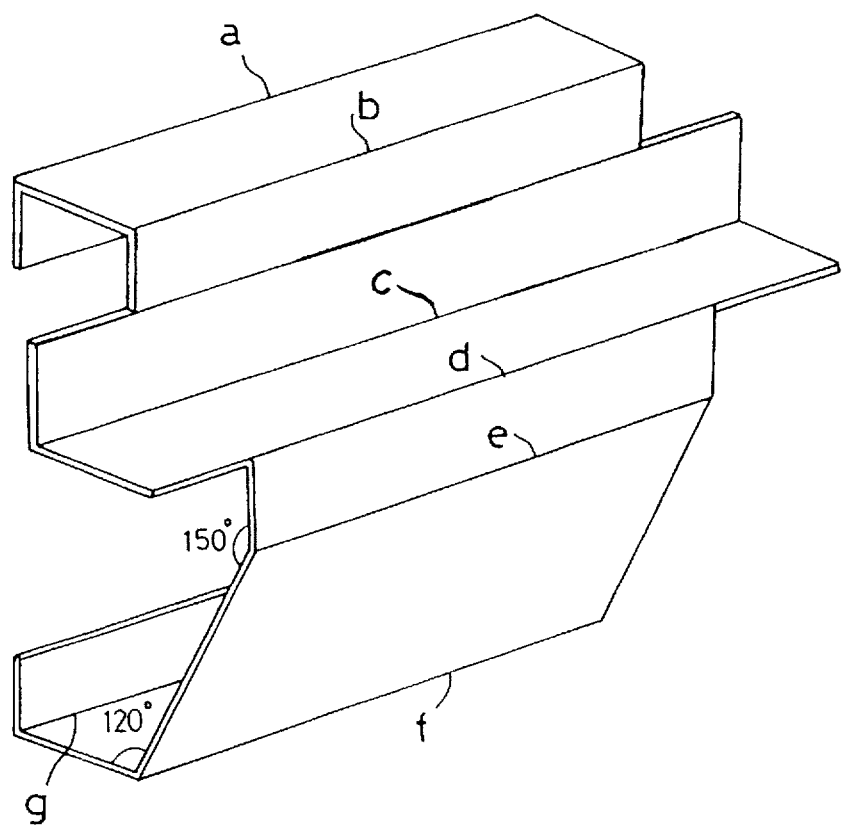

In this embodiment, the invention has been particularly described with the case where a plurality of bends are classified into two groups G1 and G2 according to the length of a bending line, but it is also possible to classify bends having different bending angles as shown in FIG. 6 into five groups (G1, G2, G3, G4, G5) according to two processing factors such as the target bending angle and the length of a bending line. One example of the grouping table in this case is shown in Table 2.

TABLE 2

| GROUP | G1 | G2 | G3 | G4 | G5 |
|---|---|---|---|---|---|
| BEND CODE | a, b | c, d | e | f | g |
| TARGET BENDING ANGLE | 90° | 90° | 150° | 120° | 90° |
| LENGTH OF BENDING LINE | 2,000 | 2,400 | 2,200 | 2,200 | 2,200 |
| . | . | . | . | . | . |
| . | . | . | . | . | . |
| . | . | . | . | . | . |

While the foregoing embodiment has been particularly described with a bending angle measuring device which comprises a slit-like light source and a CCD camera for picking up a linear projected light image formed by the light source and which utilizes image processing for measuring a bending angle, the invention is not limitative to use of such a bending angle measuring device but may employ a wide variety of systems. For example, it is possible to use a system in which a plurality of distance sensors (e.g., eddy current sensors and electrical capacitance sensors) are employed to measure the distance from each sensor to the workpiece and the differences between the measured distances are obtained thereby detecting a bending angle. Also, use of a contact-type measuring device is conceivable.

While the invention is applied to a press brake of the so-called over-drive type in which the upper die is driven with the lower die being stationary and a lower limit value for the ram carrying the upper die is corrected in the foregoing embodiment, the invention is also applicable to a press brake of the so-called under-drive type in which the lower die is driven with the upper die being stationary. In the case of the under-drive type, an upper limit value for the ram carrying the lower die is of course corrected in the same way as described earlier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An automatic correction method for correcting a die driving amount of a movable die based on a measured value obtained by measuring a bending angle of a workpiece during bending operation, comprising the steps of:

for bending the workpiece at a plurality of positions to form a plurality of bends, determining a correction value for the die driving amount of the movable die to form a certain bend, said correction value being based on a measured value obtained from a measurement of the angle of said certain bend, and utilizing said correction value for calculation of another correction value for the die driving amount of the movable die to form one of the remaining bends for which bending angle measurement is not carried out.

2. An automatic correction method for correcting the die driving amount of a movable die according to claim 1, further comprising the step of classifying said plurality of bends into groups according to processing factors associated with their bending angles, and when one of said classified bends is in the same group as that of said certain bend, carrying out said calculation of the another correction value for the die driving amount for one of the remaining bends.

3. An automatic correction method for correcting the die driving amount of a movable die according to claim 2, further comprising the step of preliminarily establishing a tolerance for each processing factor associated with the bending angles of the bends to be used in the classification of the bends according to the processing factors and if the processing factors of a bend fall within the tolerances of the processing factors for a particular group, classifying said bend into said particular group.

4. An automatic correction method for correcting the die driving amount of a movable die according to claim 2, further comprising the step of, if one of said classified bends belongs to a group different from that of said certain bend, obtaining the correlation between the respective processing factors of these two different groups, and based on the correlation, calculating the correction value for the die driving amount for said former bend.

5. An automatic correction method for correcting the die driving amount of a movable die according to claim 4, further comprising the step of preliminarily establishing a tolerance for each processing factor associated with bending angles of the bends to be used in the classification of the bends according to the processing factors and if the processing factors of a bend fall within the tolerances of the processing factors for a particular group, classifying said bend into said particular group.

6. An automatic correction method for correcting the die driving amount of a movable die according to any one of claims 2 to 5, further comprising the step of determining examples of the processing factors associated with the bending angles of the bends to include a target bending angle for a bend, a length of a bending line, a configuration of an upper die and a configuration of a lower die.

* * * * *